(12) United States Patent
Cruz-Albrecht et al.

(10) Patent No.: US 10,147,035 B2
(45) Date of Patent: Dec. 4, 2018

(54) NEURAL INTEGRATED CIRCUIT WITH BIOLOGICAL BEHAVIORS

(71) Applicant: HRL Laboratories, LLC, Malibu, CA (US)

(72) Inventors: Jose Cruz-Albrecht, Oak Park, CA (US); Timothy Derosier, Colorado, CO (US); Narayan Srinivasa, Hillsboro, OR (US)

(73) Assignee: HRL Laboratories, LLC, Malibu, CA (US)

( * ) Notice: Subject to any disclaimer, the term of this patent is extended or adjusted under 35 U.S.C. 154(b) by 70 days.

(21) Appl. No.: 15/199,800

(22) Filed: Jun. 30, 2016

(65) Prior Publication Data

US 2018/0005108 A1   Jan. 4, 2018

(51) Int. Cl.
| | |
|---|---|
| G06F 15/00 | (2006.01) |
| G06N 3/063 | (2006.01) |
| G06F 7/50 | (2006.01) |
| G06F 7/523 | (2006.01) |
| G06F 7/48 | (2006.01) |

(52) U.S. Cl.
CPC .............. *G06N 3/063* (2013.01); *G06F 7/48* (2013.01); *G06F 7/50* (2013.01); *G06F 7/523* (2013.01); *G06F 2207/4824* (2013.01)

(58) Field of Classification Search
CPC ............ G06N 3/063; G06F 7/523; G06F 7/50
USPC ......................................................... 706/44
See application file for complete search history.

(56) References Cited

U.S. PATENT DOCUMENTS

| | | | |
|---|---|---|---|
| 3,569,842 | A | 3/1971 | Schroyer |
| 3,824,411 | A | 7/1974 | Wharton |
| 5,387,882 | A | 2/1995 | Schoofs |
| 5,537,562 | A | 7/1996 | Gallup et al. |
| 5,650,739 | A | 7/1997 | Hui et al. |
| 5,907,250 | A | 5/1999 | Baizley et al. |
| 6,052,011 | A | 4/2000 | Dasgupta |

(Continued)

FOREIGN PATENT DOCUMENTS

| | | |
|---|---|---|
| CN | 101771413 A | 7/2010 |
| CN | 101971166 A | 2/2011 |
| CN | 102567784 A | 7/2012 |

OTHER PUBLICATIONS

Jose M Cruz-Albrecht, "A scalable neural chip with synaptic electronics using CMOS integrated memristors", Nanotechnology, vol. 24 (2013) 384011.*

(Continued)

*Primary Examiner* — Vu A Vu
(74) *Attorney, Agent, or Firm* — Ladas & Parry

(57) ABSTRACT

A circuit for emulating the behavior of biological neural circuits, the circuit including a plurality of nodes wherein each node comprises a neuron circuit, a time multiplexed synapse circuit coupled to an input of the neuron circuit, a time multiplexed short term plasticity (STP) circuit coupled to an input of the node and to the synapse circuit, a time multiplexed Spike Timing Dependent Plasticity (STDP) circuit coupled to the input of the node and to the synapse circuit, an output of the node coupled to the neuron circuit; and an interconnect fabric coupled between the plurality of nodes for providing coupling from the output of any node of the plurality of nodes to any input of any other node of the plurality of nodes.

27 Claims, 10 Drawing Sheets

(56) References Cited

U.S. PATENT DOCUMENTS

| | | | |
|---|---|---|---|
| 6,121,811 | A | 9/2000 | Scott et al. |
| 6,124,730 | A | 9/2000 | Agrawal et al. |
| 6,124,746 | A | 9/2000 | Van Zalinge |
| 6,249,144 | B1 | 6/2001 | Agrawal et al. |
| 6,466,076 | B2 | 10/2002 | Yoshikawa |
| 6,581,046 | B1 | 6/2003 | Ahissar |
| 7,587,541 | B2 | 9/2009 | Chen |
| 7,724,168 | B1 | 5/2010 | Cruz-Albrecht et al. |
| 7,750,835 | B1 | 7/2010 | Albrecht et al. |
| 7,822,698 | B1 | 10/2010 | Cruz-Albrecht et al. |
| 8,600,919 | B2 | 12/2013 | Poon et al. |
| 8,812,414 | B2 | 8/2014 | Arthur et al. |
| 8,975,935 | B1 | 3/2015 | Yung et al. |
| 8,996,431 | B2 | 3/2015 | Cruz-Albrecht et al. |
| 2002/0027465 | A1 | 3/2002 | Yoshikawa |
| 2004/0217794 | A1 | 11/2004 | Strysko |
| 2010/0109626 | A1 | 5/2010 | Chen |
| 2011/0004579 | A1 | 1/2011 | Snider |
| 2012/0011089 | A1 | 1/2012 | Aparin et al. |
| 2012/0011092 | A1 | 1/2012 | Tang et al. |
| 2012/0036099 | A1 | 2/2012 | Venkatraman et al. |
| 2012/0110891 | A1 | 5/2012 | Minnameier |
| 2012/0150781 | A1 | 6/2012 | Arthur et al. |
| 2013/0031040 | A1 | 1/2013 | Modha |
| 2014/0032460 | A1 | 1/2014 | Albrecht et al. |
| 2014/0032465 | A1 | 1/2014 | Modha |
| 2014/0250037 | A1 | 9/2014 | Izhikevich et al. |
| 2015/0220831 | A1 | 8/2015 | Hunzinger et al. |
| 2016/0224889 | A1 | 8/2016 | Alvarez Icaza Rivera et al. |

OTHER PUBLICATIONS

Marko Noack, "Switched-capacitor realization of presynaptic short-term-plasticity and stop-learning synapses in 28nm CMOS", Frontiers in Neuroscience, vol. 9, article 10, 2015.*

From PCT/US2017/035323, PCT International Search Report and Written Opinion dated Sep. 7, 2017.

From U.S. Appl. No. 14/453,154 (now U.S. Publication No. 2016-0364643 A1) Non Final Office Action dated Jan. 25, 2017.

Bofill-i-Petit et al.: "Synchrony Detection and Amplification by Silicon Neurons With STDP Synapses". IEEE Transactions on Neural Networks. vol. 15, No. 5, Sep. 1, 2004. pp. 1296-1304.

From EPO Application No. 12881688.1, EPO Supplementary Search Report with Search Opinion dated Apr. 26, 2017.

U.S. Appl. No. 13/151,763, Cruz-Albrecht et al.

U.S. Appl. No. 13/931,024, Yung et al.

U.S. Appl. No. 14/453,154, Cruz-Albrecht et al.

Bartolozzi, Chiara et al., "Silicon Synaptic Homoestasis," Brain Inspired Cognitive Systems, p. 1-6, (Oct. 2014).

Cruz-Albrecht, J. et al., "A scalable neural chip with synaptic electronics using CMOS integrated memristors," Nanotechnology, vo. 24, No. 38, Sep. 2013.

Cruz-Albrecht, J.M. et al., 'Energy-Efficient Neuron, Synapse and STDP Integrated Circuits.' IEEE Transactions on Biomedical Circuits and Systems, vol. 6, No. 3, pp. 246-256, (Jun. 2012).

Cruz-Albrecht, Jose M. et al., "A Scalable Neural Chip with Synaptic Electronics using CMOS Integrated Memristors," Nanotechnology, pp. 1-11, (Sep. 2013).

Cruz, J. et al., "A 16×16 Cellular Neural Network Chip: The First Complete Single-Chip Dynamic Computer Array with Distributed Memory and with Gray-Scale Input-Output," Analog Integrated Circuits and Signal Processing, vol. 15, No. 3 pp. 227-238, (Mar. 1998).

From U.S. Appl. No. 13/679,727 (now U.S. Pat. No. 8,996,431), Notice of Allowance dated Nov. 20, 2014.

From U.S. Appl. No. 13/931,024 (now U.S. Pat. No. 8,975,935), Notice of Allowance dated Dec. 15, 2014.

International Preliminary Report on Patentability for PCT/US2012/065640 dated Jan. 27, 2015.

International Search Report and Written Opinion for PCT/US2012/065640 dated Mar. 28, 2013.

Izhikevich, E.M. Et al., "Large-scale model of mammalian thalamocortical systems (Supporting Information, Appendix)", Proceedings National Academy of Sciences (PNAS), vo. 105, No. 9, pp. 3593-3598, 2008.

Jo et al. "Nanoscale Memristor Device as Synapse in Neuromorphic Systems," NanoLetters, pp. 1297-1301, (Mar. 2010).

Kuk-Hwan Kim et al., "A Functional Hybrid Memristor Crossbar-Array/CMOS Systems for Data Storage and Neuromorphic Applications," Nano Letters, vol. 12, Issue No. 1, pp. 389-395, (Jan. 2012).

Lazzaro, John, "Low-Power Silicon Spiking Neurons and Axons," IEEE Symposium on Circuits and Systems, pp. 2220-2223, (1992).

Minkovich, K. et al, "Programming Time-Multiplexed Reconfigurable Hardware Using a Scalable Neuromorphic Compiler," IEEE Transactions on Neural Network and Learning Systems, vol. 23, No. 6, pp. 889-901, (Jun. 2012).

Chinese Office Action from Chinese Patent Application No. 201280073534.6 dated Nov. 3, 2015 with English translation.

From U.S. Appl. No. 14/453,154 (now U.S. Publication No. 2016-0364643 A1) Final Office Action dated Jul. 11, 2017.

From U.S. Appl. No. 14/453,154 (now U.S. Publication No. 2016-0364643 A1) Final Office Action dated Apr. 16, 2018.

* cited by examiner

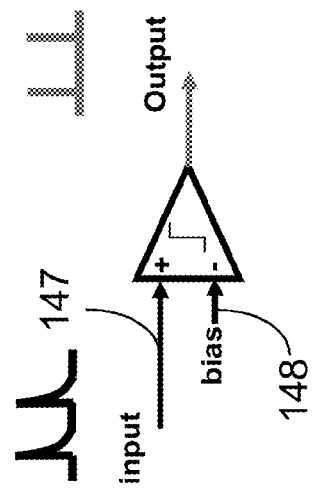
FIG. 8B
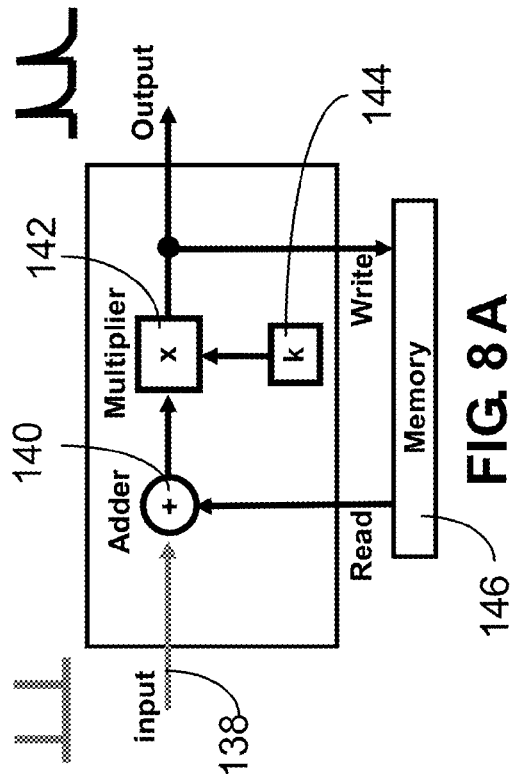
FIG. 8A
FIG. 8C
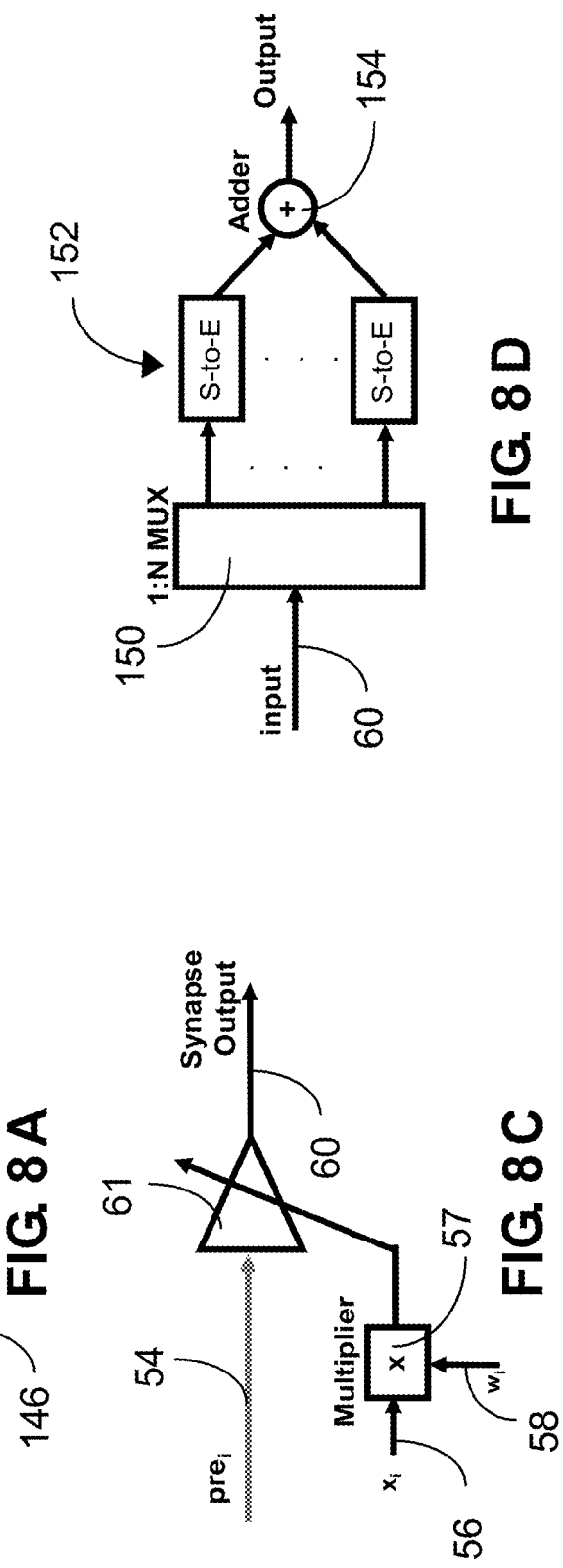
FIG. 8D

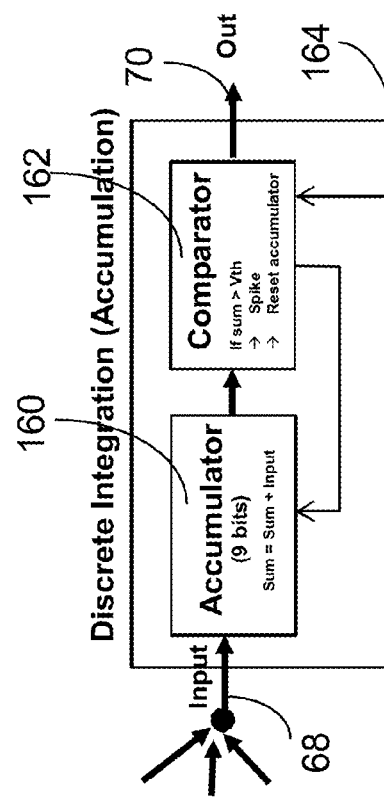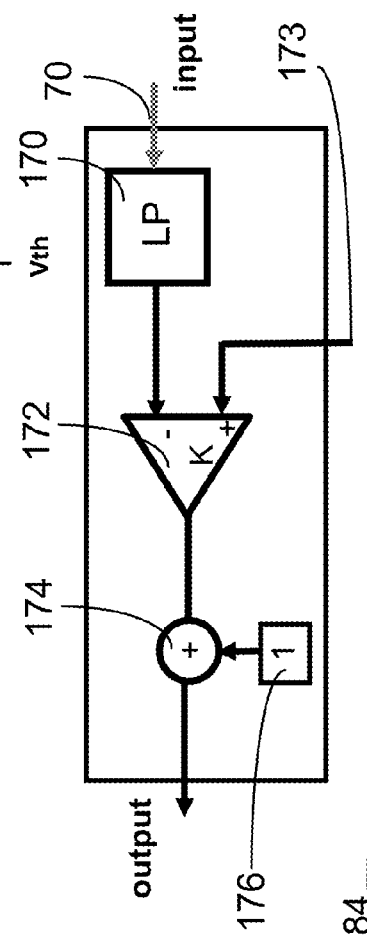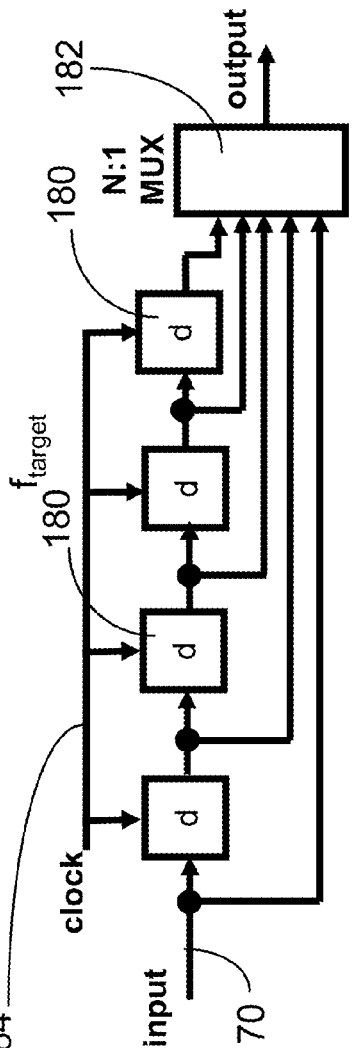
FIG. 9A
FIG. 9B
FIG. 9C

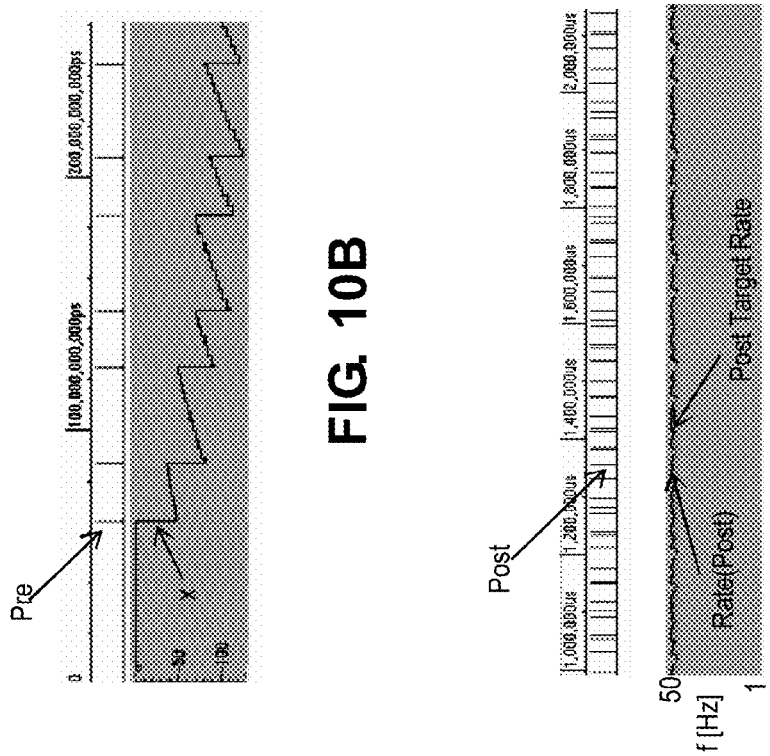
FIG. 10B
FIG. 10C
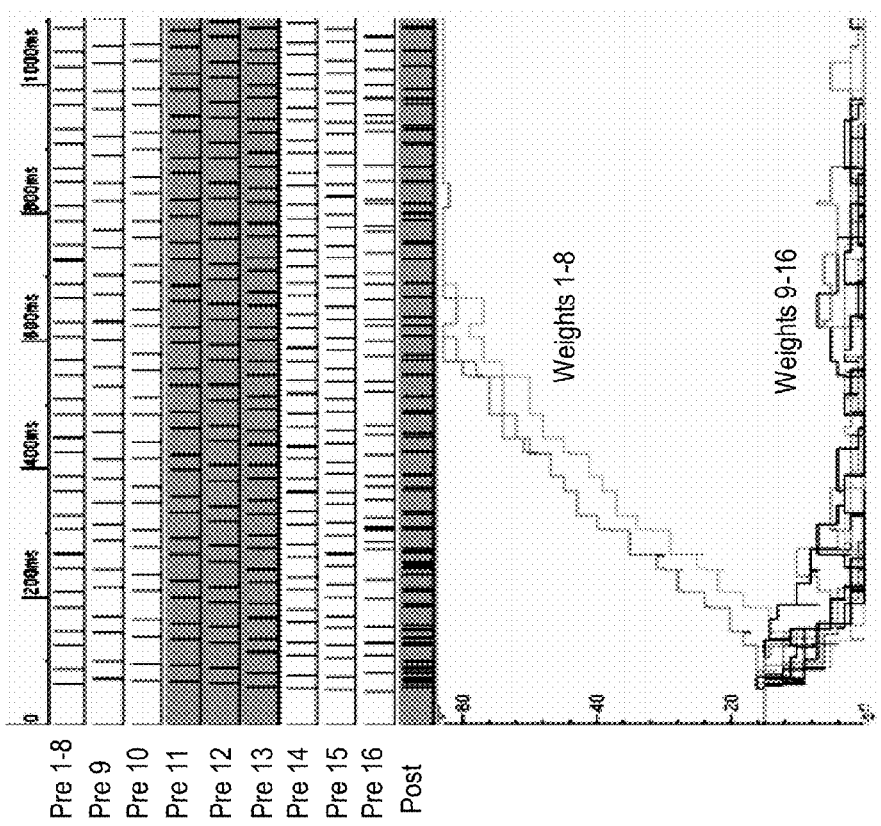
FIG. 10A

NEURAL INTEGRATED CIRCUIT WITH BIOLOGICAL BEHAVIORS

STATEMENT REGARDING FEDERAL FUNDING

This invention was made under U.S. Government contract HRL0011-09-C-001. The U.S. Government has certain rights in this invention.

CROSS REFERENCE TO RELATED APPLICATIONS

This application is related to U.S. patent application Ser. No. 14/453,154, filed Aug. 6, 2014 and U.S. patent application Ser. No. 13/679,727, filed Nov. 16, 2012, which is now U.S. Pat. No. 8,996,431, issued Mar. 31, 2015, which are incorporated herein as though set forth in full.

TECHNICAL FIELD

This disclosure relates to neural network circuits.

BACKGROUND

In the prior art, circuits have been used to emulate the behavior of biological neural circuits. In Reference [1] below, which is incorporated herein by reference, models of neural circuits are given. However, no circuit implementation is presented. In References [2], [3] and [4] below, which are incorporated herein by reference, circuits are described that implement neurons and synapses. However the circuits of References [2] and [3] only include some biological behaviors. In Reference [4] below, which is incorporated herein by reference, some biological behaviors are presented such as homeostatic plasticity (HP), kinetic dynamics (KD), and axonal delay (AD) in a single neuron; however, Reference [4] does not include synapses with Short Term Plasticity (STP) and Spike Timing Dependent Plasticity (STDP), and does not integrate behaviors in a circuit with multiple neurons and synapses.

REFERENCES

The following references are incorporated herein by reference.

[1] E. M. Izhikevich and G. M. Edelman, "Large-scale model of mammalian thalamocortical systems (Supporting Information, Appendix)", Proceedings National Academy of Sciences (PNAS), vo. 105, no. 9, pp. 3593-3598, 2008.

[2] J. M. Cruz-Albrecht, T. Derosier, and N. Srinivasa, "A scalable neural chip with synaptic electronics using CMOS integrated memristors," Nanotechnology, vo. 24, no. 38, September 2013.

[3] J. Cruz-Albrecht, T. Derosier, and N. Srinivasa, U.S. patent application Ser. No. 14/453,154, filed Aug. 6, 2014, titled "Scalable Integrated Circuit with Synaptic Electronics and CMOS integrated Memristors".

[4] J. Cruz-Albrecht, M. Yung and N. Srinivasa, U.S. patent application Ser. No. 13/679,727, filed Nov. 16, 2012, which is now U.S. Pat. No. 8,996,431, issued Mar. 31, 2015, titled "Spike Domain Neuron Circuit with Programmable Kinetic Dynamics, Homeostatic Plasticity and Axonal Delays".

What is needed is an electronic circuit that is compatible with integrated circuit technology and that emulates the behavior of biological neural circuits. The embodiments of the present disclosure answer these and other needs.

SUMMARY

In a first embodiment disclosed herein, a circuit for emulating the behavior of biological neural circuits, the circuit comprises a plurality of nodes wherein each node comprises a neuron circuit, a time multiplexed synapse circuit coupled to an input of the neuron circuit, a time multiplexed short term plasticity (STP) circuit coupled to an input of the node and to the synapse circuit, a time multiplexed Spike Timing Dependent Plasticity (STDP) circuit coupled to the input of the node and to the synapse circuit, and an output of the node coupled to the neuron circuit, and an interconnect fabric coupled between the plurality of nodes for providing coupling from the output of any node of the plurality of nodes to any input of any other node of the plurality of nodes In another embodiment disclosed herein, a method for emulating the behavior of biological neural circuits comprises providing a plurality of nodes, providing a neuron circuit in each node, providing a synapse circuit in each node coupled to an input of the neuron circuit, providing a short term plasticity (STP) circuit in each node coupled to an input of the node and to the synapse circuit, providing a Spike Timing Dependent Plasticity (STDP) circuit in each node coupled to the input of the node and to the synapse circuit, providing an output of the node coupled to the neuron circuit, time multiplexing the synapse, the STP, and the STDP circuits; and providing an interconnect fabric coupled between the plurality of nodes for providing coupling from the output of any node of the plurality of nodes to any input of any other node of the plurality of nodes.

These and other features and advantages will become further apparent from the detailed description and accompanying figures that follow. In the figures and description, numerals indicate the various features, like numerals referring to like features throughout both the drawings and the description.

BRIEF DESCRIPTION OF THE DRAWINGS

FIG. 8A shows a detail of a "S-to-E" (Spike-to-Exponential) circuit, FIG. 8B shows a detail of a "E-to-S" (Exponential-to-Spike) circuit, FIG. 8C shows a detail of the synapse, and FIG. 8D shows a detail of a kinetic dynamics (KD) circuit in accordance with the present disclosure;

FIG. 9A shows a neuron, FIG. 9B shows a homeostatic plasticity (HP) circuit, and FIG. 9C shows an Axonal Delay (AD) circuit in accordance with the present disclosure; and FIG. 10A shows the results of simulations of a network with neurons and synapses, FIG. 10B shows the results of simulations of a STP circuit, and FIG. 10C shows the results of simulations of a HP circuit in accordance with the present disclosure.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Figure 1:
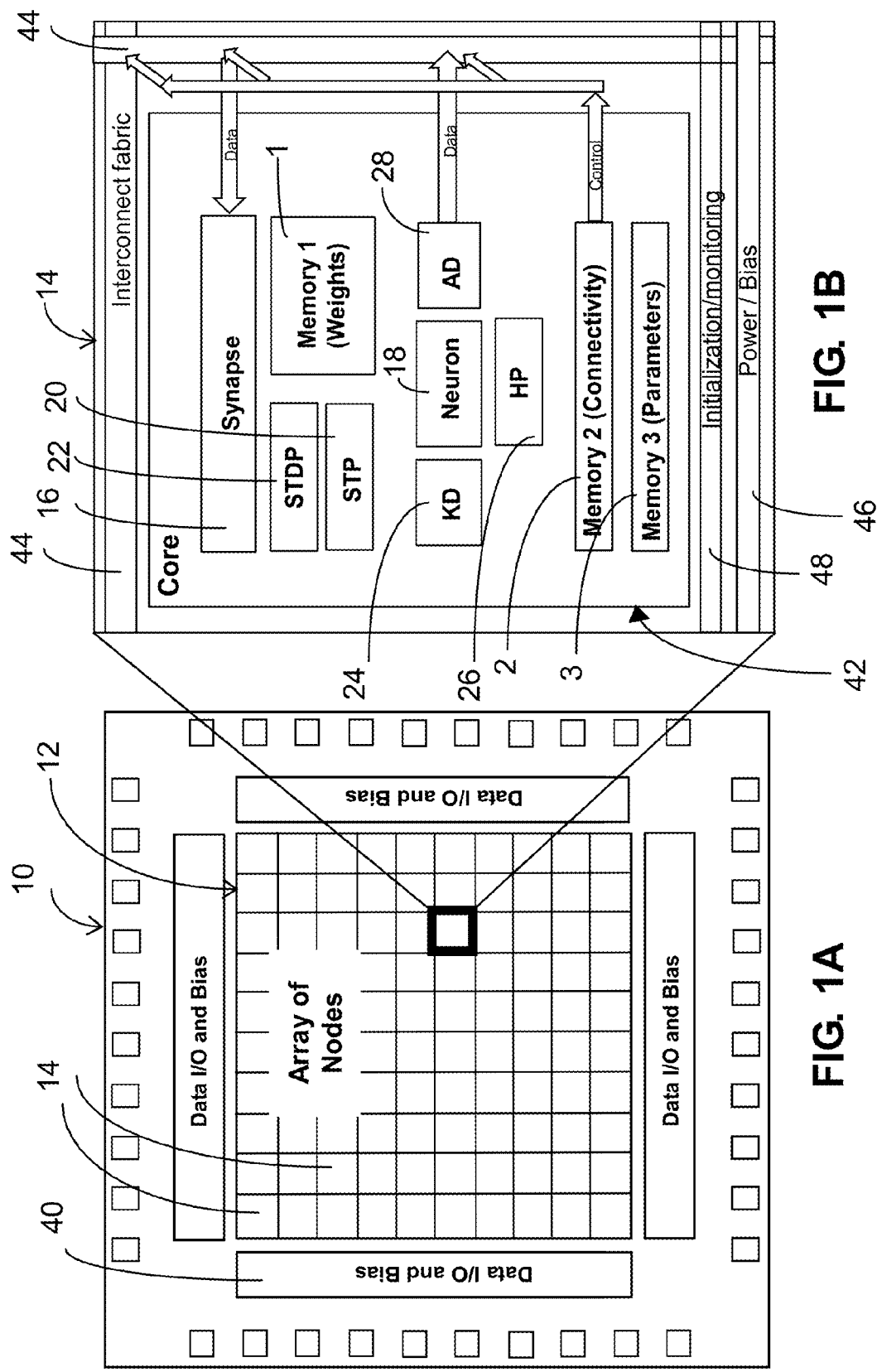
FIG. 1A shows a top level diagram of neural circuit.
FIG. 1B shows a diagram of a node in accordance with the present disclosure.

The present disclosure describes a neural circuit 10 that has a plurality of processing nodes 12, as shown in FIG. 1A, the processing nodes 12 may be arranged in an array and in one embodiment the array may be an array of 32×32 nodes for a total of 1024 nodes. The processing nodes 12 may be arranged in any arbitrary topology, rather than the array shown in FIG. 1A. The neural circuit 10 includes electronic neuron and synapse circuits that have spiking signals at biological rates. The electronic neurons and synapses may mimic multiple behaviors of biological neurons and synapses, including Short Term Plasticity (STP), different types of Spike Timing Dependent Plasticity (STDP), synaptic Kinetic Dynamics (KD), neural Homeostatic Plasticity (HP), and Axonal Delays (AD). The neural circuit 10 saves hardware cost and complexity by using time multiplexing.

A node 14, as shown in FIG. 1B, is described that implements a synapse 16 and neuron 18 and includes a Short Term Plasticity (STP) circuit 20, a Spike Timing Dependent Plasticity (STDP) circuit 22, a synaptic Kinetic Dynamics (KD) circuit 24, a neural Homeostatic Plasticity (HP) circuit 26, and an Axonal Delay (AD) circuit 28. The node 14 uses time multiplexing to reduce hardware complexity. The STP circuit 20 has a time multiplexed circuit together with a memory 1 that is used to store STP states, as further described below. The STDP circuit 22 also has a time multiplexed circuit together with the memory 1 that is used to store STDP states, as further described below. The neural circuit 10 can be used to perform real-time low-power biological-type neural computations, and can implement over 1000 neurons and over 100,000 synapses.

The neural circuit 10 has an array of nodes 14 and data input/output circuitry 40. FIG. 1B shows a diagram of one node 14 of the array of nodes 14 in FIG. 1A. The node 14 shown in FIG. 1B has periphery circuitry and core circuitry 42. The periphery circuitry includes an interconnect fabric 44 that may be used to send data from any node 14 to another node 14. The interconnect fabric 44 may include interconnect buses 44 and routing switches. The routing switches, which are described in Reference [3], determine which node 14 at any one time is connected to another node 14, and this connectivity is determined by connectivity data in memory 2. The periphery circuitry also includes buses 46 that are used to power and bias the nodes 14 and buses 48 that are used to send initial parameter data into the memories 1, 2 and 3 of the core circuitry 42. Memory 3 stores parameters that are used by the circuitry in the node 14, as further described below. The buses 48 may also be used to monitor some of the internal signals of the core circuitry 42.

The core circuitry 42 of the node 14 includes the synapse circuit 16, the STP (Short Term Plasticity) circuit 20, which adjusts the behavior of the synapse circuit 16, the STDP (Spike Timing Dependent Plasticity) circuit 22 that also adjusts the behavior of the synapse circuit 16, and a memory 1, which may also be a referred to as a weight memory that stores weights used by the synapse 16, the STP circuit 20, and the STDP circuit 22, as explained below. The core circuitry 42 also includes the neuron circuit 18, the KD (Kinetic dynamics) circuit 24, which pre-processes signals that are provided into the neuron circuit 18, the HP (Homeostatic plasticity) circuit 26 that regulates the behavior of the neuron circuit 18, and the AD (Axonal Delay) circuit 28 that post-processes signals generated by the neuron circuit 18. The core circuitry 42 further includes memory 2 that stores the connectivity states for the interconnect fabric 44, as further described in Reference [3], and memory 3 that stores parameters that regulate the behavior of the neuron circuit 18, the STP circuit 20, the STDP circuit 22, the synapse circuit 16, the KD circuit 24, the AD circuit 28, the HP circuit 26, and the Spike to Exponential (S-to-E) circuits 72 and 74.

Figure 2:
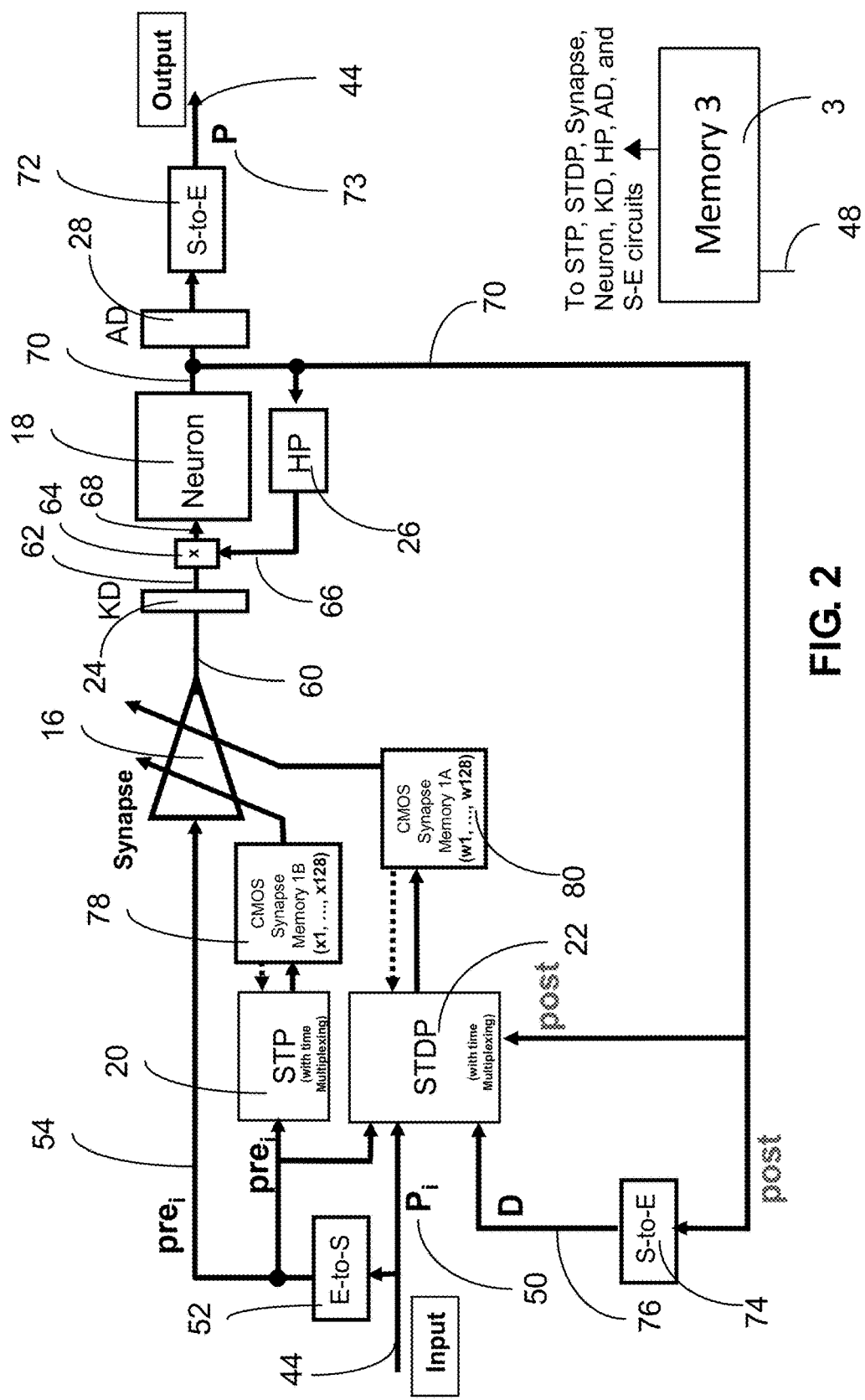
FIG. 2 shows a diagram of the core of a node and connections among the components of the node in accordance with the present disclosure.

FIG. 2 is a diagram showing the connectivity of different components of the core circuitry 42 of the node 14. Data arriving from the interconnect fabric 44 is fed into the STDP circuit 22, and also into an Exponential to Spike (E-to-S) circuit 52. The input 50 to the node 14 is an input signal $P_i$ that comes from the interconnect fabric 44. The signal $P_i$ contains signals that each have a falling exponential tail. The signal $P_i$ is time multiplexed, and in each time slot the interconnect fabric 44 may be controlled via the routing switches so that in each time slot the signal $P_i$ comes from the output P 73 from another node 14.

Figure 4:
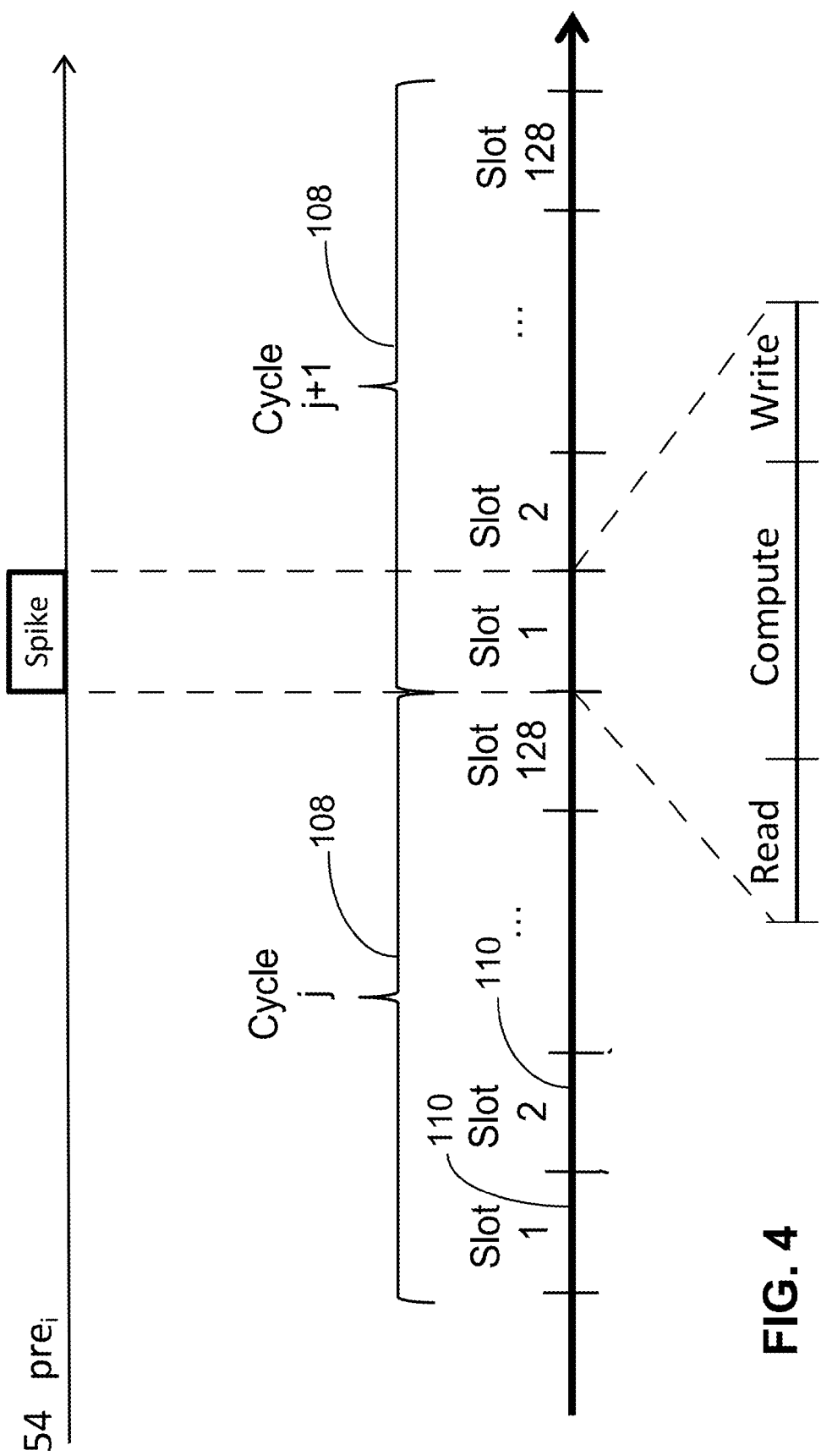
FIG. 4 shows a timing diagram of the STP circuit and shows one example $pre_i$ spike in accordance with the present disclosure.

For example, the interconnect fabric 44 may be controlled so that during a cycle 108, as shown in FIG. 4, a particular node 14 receives a $P_i$ for i=1 to 128 from each of 128 other nodes 14. Each $P_i$ is sent on the interconnect fabric 44 in a time slot 110, as shown in FIG. 4.

The E-to-S (Exponential to Spike) circuit 52 has an output 54 $pre_i$, which is connected to the synapse circuit 16, the STP circuit 20, and to the STDP circuit 22. The E-to-S circuit 52 and the $pre_i$ 54 are time multiplexed, in the same manner as $P_i$. FIG. 4 shows a particular $pre_i$ 54 spike, which is aligned in FIG. 4 with time slot 110 number 1. In any particular time slot 110 there may or may not be any $pre_i$ 54 spike, because the $pre_i$ 54 is a result of P 73 from another node 14, which may or may not have had its neuron 18 spike, as further described below.

The synapse circuit 16 scales the time multiplexed $pre_i$ 54 from the E-to-S circuit 52 on each time slot 110. A synaptic gain or weight determines the amount of scaling. This synaptic weight is equal to a product of a $w_i$ and an $x_i$ value. The value $x_i$ is calculated for each time slot 110 by the STP circuit 20, and the value of $w_i$ is calculated for each time slot 110 by the STDP circuit 22.

The time multiplexed outputs 60 of the synapse circuit 16 are scaled spike signals that are applied to the KD circuit 24. The KD circuit 24 converts the scaled spike signals to step signals with a falling exponential tail. The output 62 of the KD circuit 24 is input to a multiplier circuit 64 that is used to scale the output 62. The amount of scaling is determined by the HP circuit 26, whose output 66 is connected to the multiplier circuit 64. The output 68 of the multiplier circuit 64 is then input to the neuron circuit 18.

The neuron circuit 18 receives the time multiplexed input 68, which is the result of the time multiplexed signal $P_i$ 50, and the time multiplexed STP 20, SDTP 22, synapse 16, KD 24, and multiplier 64 circuits, and produces an output 70, which is a spike-type signal when it occurs. The output 70 of the neuron circuit 18 is not time multiplexed and may typically occur at a rate of 10-100 Hz or there may be no output spike at all. The rate may range from 0 Hz to less than 1 kHz. The output 70 from the neuron circuit 18 is sent to the AD circuit 28, then to a S-to-E (Spike to Exponential) converter circuit 72 to produce output P 73, and finally to the interconnect fabric 44. The output P 73 is an falling exponential type signal that is 0.1 to 700 milliseconds long depending on parameters in the S-to-E circuit 72.

The output 70 of the neuron circuit 18 is also sent to the HP circuit 26, which regulates the spike rate of the neuron circuit 18. Also, the output 70, which may be referred to as the post signal, of the neuron circuit 18 is sent to the STDP circuit 22, and to a S-to-E (Spike to Exponential) converter circuit 74, whose output 76 is sent to the STDP circuit 22.

The memory 1, shown in FIG. 1B, may have two subparts. One part, which is denoted as memory1B 78 in FIG. 2, stores the values $x_i$ that are used by the STP circuit 20 and the synapse 16. The other part of memory 1, which is denoted as memory1A 80 in FIG. 2, stores the $w_i$ values that are used by the STDP circuit 22 and the synapse 16. Memory 2, shown in FIG. 1B, is similar to a connectivity memory described in Reference [3], and is used to control the routing switches in interconnect fabric 44. Memory 3 shown in FIG. 1B is used to locally store control parameters for the neuron 18, synapse 16, STP 20, STDP 22, neuron 18, KD 24, AD 28, and HP 26 circuits, and S-to-E circuit 72 and 74.

Figure 3:
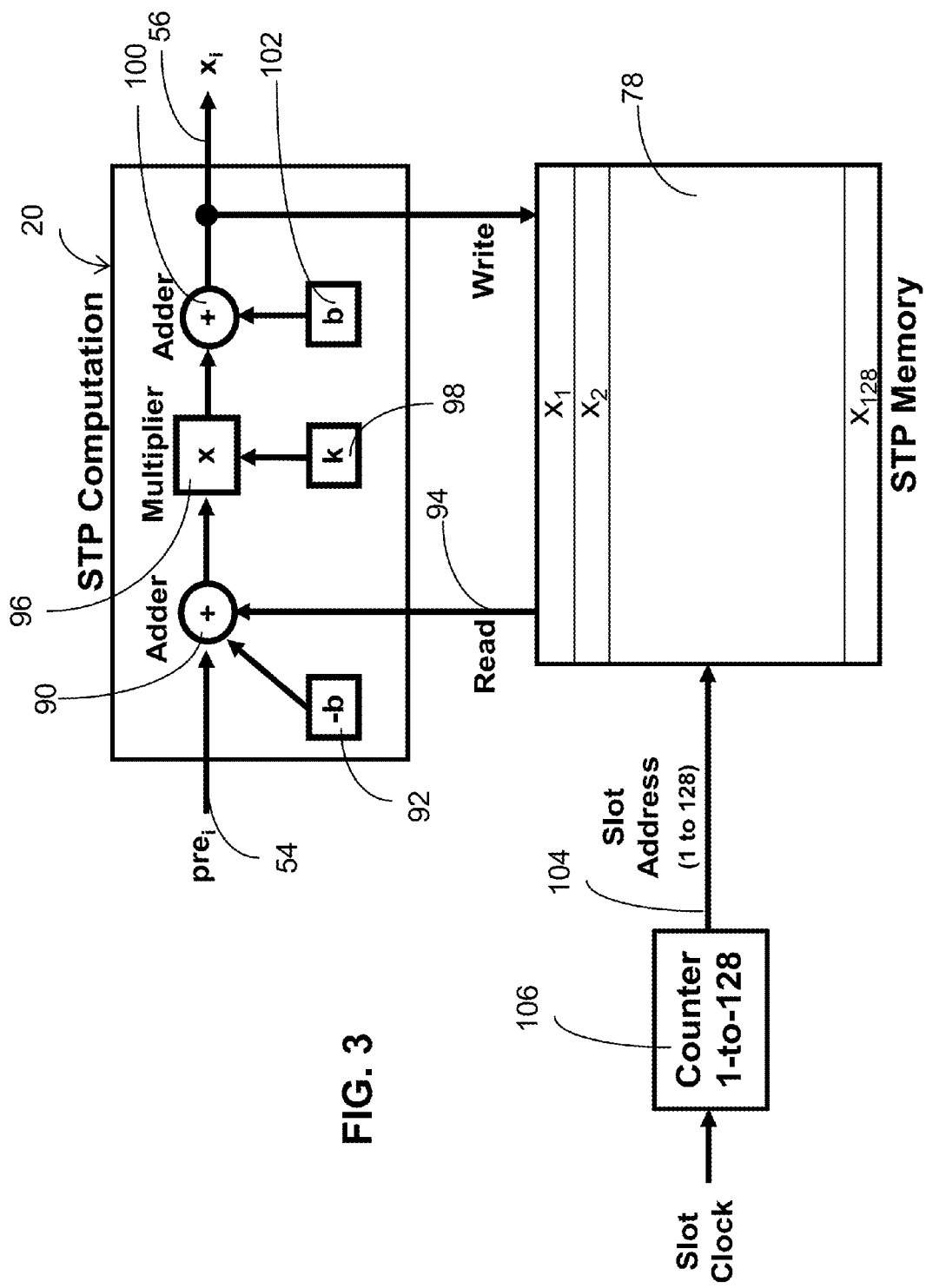
FIG. 3 shows a detail of the short term plasticity (STP) circuit with time multiplexing in accordance with the present disclosure.

FIG. 3 shows a detail of the STP circuit 20 and associated STP memory 78, which may be Memory1B 78, shown in FIG. 2. The STP computation circuit is composed of an adder 90 that receives the time multiplexed $pre_i$ 54, a bias term −b 92 which is from memory 3, and data 94 read from STP memory 78. The pre input 54 is a spiking signal that has only two possible values: high or zero. The bias −b 92 is a constant. In one embodiment b=1, so −b equals −1. The data 94 read from the STP memory 78 encodes a positive value. It is stored digitally as a multi-bit word, which in one embodiment has 6 bits. One word 94 is read from STP memory 78 for each STP computation.

The output of the adder 90 is input to a multiplier 96, which multiplies the output of adder 90 by the parameter k 98. The value of k 98 is typically a number slightly less than 1. In one embodiment k=0.9. The output of the multiplier 96 is input to an adder 100, which adds a bias term +b 102. The value of b is the same for both −b 92 and +b 102. The output of the adder 100 is a signal $x_i$ 56 that is provided to the synapse 16, and also written into STP memory 78 at the end of each computation, which occurs during each time slot 110, as shown in FIG. 4.

The STP memory 78 can store a number of words with each row of the memory storing one word, and each column of the memory storing different bits of the words, in the usual manner. In the embodiment shown in FIG. 3 stores 128 words, which corresponds to the example above in which the output P 73 of 128 nodes 14 are time multiplexed to provide $P_i$ 50 for I=1 to 128 to a particular node 14 on each cycle 108. The memory has an address that is denoted by slot address 104. In one embodiment the slot address 104 increments by 1 from 1 to 128 for each cycle 108 and then repeats. For each time slot 110 the slot address 104 is kept constant, so that an $x_i$ 94 can be read from the memory 78, the STP computation performed, and the result $x_i$ 56 written back into the memory 78, as shown in FIGS. 3 and 4. Then the slot address is incremented to a next value for the next computation. In one embodiment a counter circuit 106 may be used to store and increment the slot address 104. When the counter reaches the maximum address value, which is 128 in the embodiment of FIG. 3, then the counter 106 is reset to the first value, which is 1 in the embodiment of the FIG. 3.

FIG. 4 shows a timing diagram of how the STP circuit 20 is operated. Time is divided into time slots 110. In one embodiment the duration of each slot is 8 microseconds. For each slot there is one operation of the STP circuit 20. As described above, during each time slot I, a value $x_i$ 94 is read from the STP memory 78, an updated value of $x_i$ 56 is derived using the STP circuit 20, and then the updated value of xi 56 is written and stored into STP memory 78 in the same STP memory address 104 from which the value $x_i$ 94 was read. In other words, the address 104 of the STP memory 78 stays the same for a time slot, so the updated value of $x_i$ 56 is written into the same memory address or slot address from which the $x_i$ 94 was read. The STP memory addresses are accessed sequentially and always in the same order. In the embodiment shown in FIGS. 3 and 4, a group of 128 slots is defined as a cycle 108. In the embodiment with 128 time slots 110 of 8 microseconds, the duration of a cycle 108 is 1.024 milliseconds.

A person skilled in the art would understand that other embodiment may have a different number and duration of time slots, with the resulting cycle time being the product of the number of time slots mupled by the time slot duration. Each time slot has the same duration.

Figure 5:
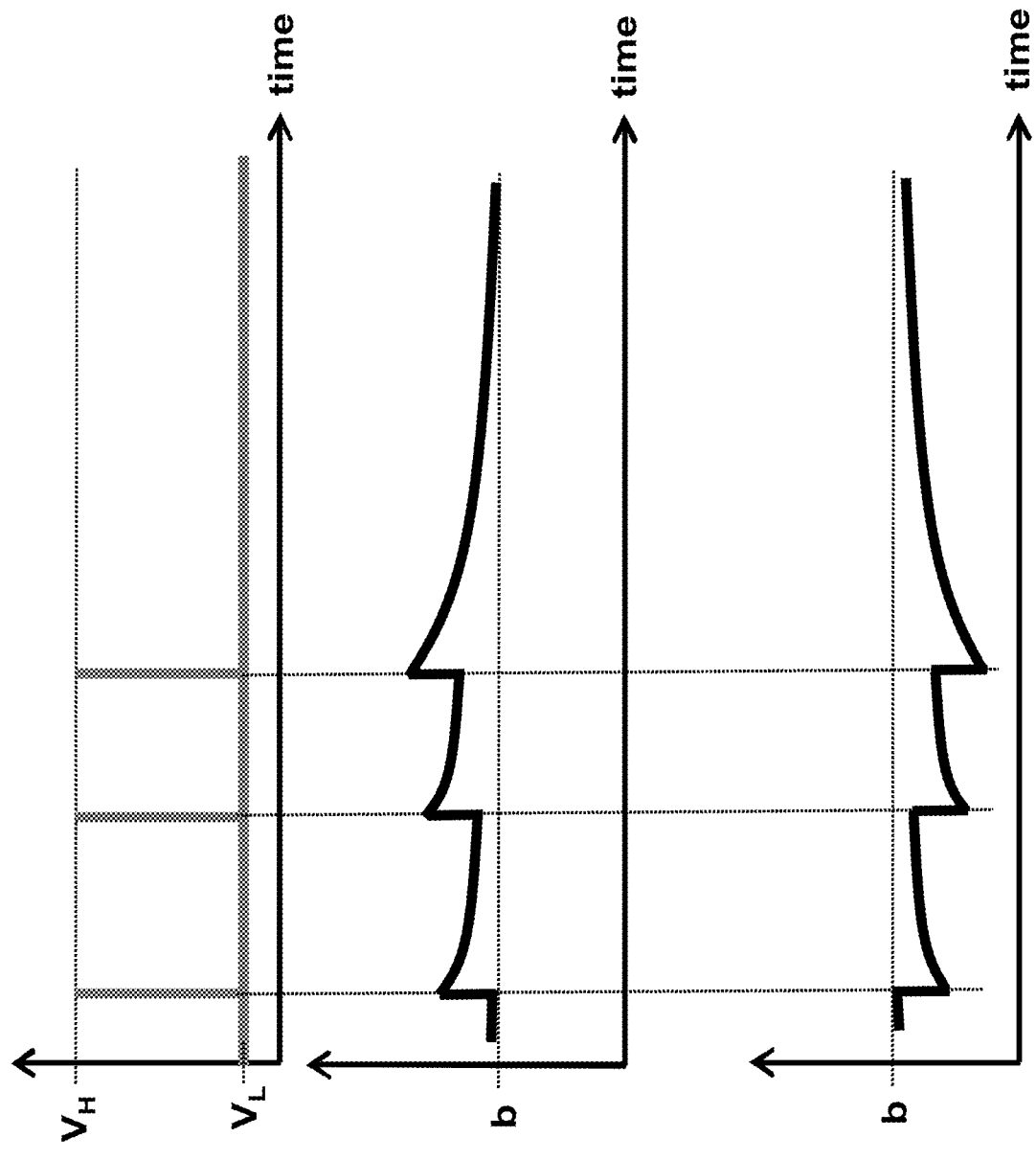
FIG. 5A shows a typical waveform at the input of the input of the STP circuit for a given slot i.
FIG. 5B shows a typical output of the circuit for signal xi for the circuit operating in a first mode.
FIG. 5C shows a typical output of the circuit for xi for the circuit operating in a second mode in accordance with the present disclosure.

FIG. 5A shows a typical waveform of the $pre_i$ input 54 of the STP circuit 20 for a given time slot i with the horizontal axis being time and the vertical axis being amplitude. The output $pre_i$ 54 of the E-to-S circuit 52 has only two possible values: a high value, which is denoted as VH, or a low value, which is denoted as VL. VL may be zero. In the STP circuit 20, the time multiplexed $pre_i$ 54 is valid for a particular time slot 110, as shown in FIG. 4, and updated once per cycle, which as described above may in one embodiment be 1.024 milliseconds long.

Neural information is encoded in the timing of the $pre_i$ 54 spikes. The interval between $pre_i$ 54 spikes is typically not constant, but rather changes. On average, the interval between spikes may be ~20 milliseconds, but it can be less, for example 10 milliseconds, or higher, for example 100 milliseconds, with a typical 1 millisecond resolution in the actual value. It is also possible that a particular $pre_i$ 54 never has a spike.

The STP circuit 20 has two modes of operation. In one mode the STP circuit produces positive xi steps every time that there is a pre spike. In the second mode the STP circuit produces negative xi steps every time that there is a pre spike.

FIG. 5B shows a typical output of the STP circuit 20 for xi 56 for the STP circuit 20 operating in the first mode. Every time that there is a spike in the $pre_i$ signal 54 then there a positive step in the signal xi 56. After the step, the signal $x_i$ 56 decays exponentially towards value b, unless another $pre_i$ signal 54 causes another positive step. When there is no step the amplitude of the signal $x_i$ 56 decays exponentially towards value b.

The time scale for the plot of FIG. 5B is much longer than the time scale of FIG. 4. The plots of FIGS. 5A, 5B and 5C span several 100's of milliseconds, while the plot of FIG. 4 spans only 2 cycles 108 of 1.024 milliseconds each for the embodiment of 128 8 microsecond time slots 110. In the plot of FIG. 5B the individual time slots are not visible. In the plot of FIG. 5B the xi signal 56 appears as a continuous waveform. However, the $x_i$ signal 56 of FIG. 5B is input to the synapse 16 only once in a particular time slot 110 i each cycle 108, or for the embodiment of FIGS. 3 and 4, once about every 1.024 milliseconds.

FIG. 5C shows a typical output of the STP circuit 20 for $x_i$ 56 for the STP circuit 20 operating in the second mode. Every time that there is a spike in the $pre_i$ signal 54 then there is a negative step in the signal $x_i$ 56. When there is no step the amplitude of the signal $x_i$ 56 increases exponentially towards the value b.

Figure 6:
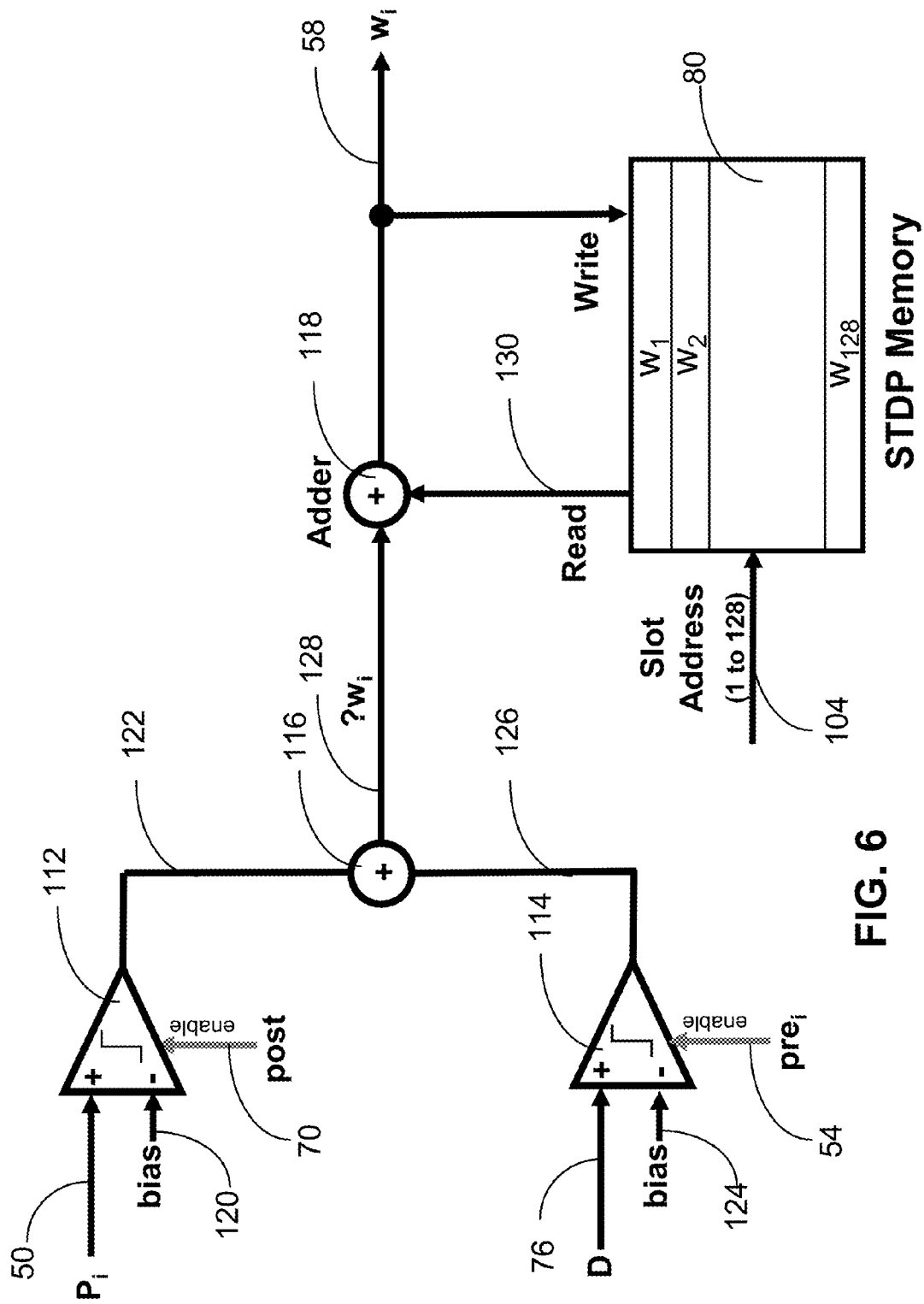
FIG. 6 shows a detail of one embodiment of an spike timing dependent plasticity (STDP) circuit in accordance with the present disclosure.

FIG. 6 shows a diagram of one STDP circuit 22, which has two comparators 112 and 114, two adders 116 and 118, and an STDP memory 80, which may be memory1A 80, shown in FIG. 2. The four data signals input to the STDP circuit 22 are: $pre_i$ 54, $P_i$ 50, post 70, which is the output of neuron 18, and D 76, as shown in FIGS. 2 and 6. The signals $pre_i$ 54 and post 70 are spiking type signals. The $P_i$ 50 and the D 76 signals consists of positive steps and falling exponentials. The STDP circuit 22 produces the signal $w_i$ 58, which as described above is used as a weight in the synapse circuit 16. The signals $pre_i$ 54, $P_i$ 50, and $w_i$ 58 are time multiplexed, and are updated every time slot 110. The signals post 70 and D 76 are updated every cycle 108. As discussed above, the output 70 of the neuron circuit 18 is not time multiplexed and may typically occur at a rate of 10-100Hz, and the rate may range from 0 Hz to less than 1 kHz. The output 70 is input to S-to-E 74, the output of S-to-E 74 is D 76, which is a falling exponential type signal that may be 0.1 to 700 milliseconds long depending on parameters in the S-to-E circuit 74.

The first comparator 112 receives the input signal P 50 and a bias reference constant 120. The first comparator 112 is enabled by the spiking signal post 70, and produces a signal u1 122. The signal u1 122 is high when the signal P 50 is higher than the bias reference constant 120 and when there is a spike at the enable post signal 70. Signal u1 122 is low or zero otherwise. The signal u1 122 is only high when a step in $P_i$ 50 has happened recently before a spike happens at enable post signal 70.

The second comparator 114 receives the input signal D 76 and a bias reference constant 124, which is the same as bias reference constant 120. The second comparator 114 is enabled by the spiking signal $pre_i$ 54, and produces a signal u2 126. The signal u2 126 is high when the signal D 76 is higher than the bias reference constant 124 and when there is a spike at enable signal $pre_i$ 54. The signal u2 126 is low or zero otherwise. The signal u2 126 is only high when a step in D 76 has happened recently before a spike happens at $pre_i$ 54.

The adder 116 sums the results of the two comparators 112 and 114, and the output of the adder 116 is the signal $\Delta w_i$ 128, which represents a change in a weight $w_i$.

The STDP memory 80 is used in one embodiment to store 128 weights for the 128 time slots. The STDP memory 80 is denoted as memory1A 80 in FIG. 2. The timing of addressing this memory is similar to the timing of the STP memory 78, as shown in FIG. 3. The slot address 104 for the STDP memory 80 may be the same as used for the STP memory 78 in FIG. 3 and can be generated by the counter 106 in FIG. 3. At every time slot 110 one weight $w_i$ 130 is read from the STDP memory 80 and added to the signal $\Delta w_i$ 128 by adder 118. The updated value of $w_i$ 58 is given by:

$$w_i(\text{updated}) = w_i(\text{read from memory 80}) + \Delta w_i \quad \text{(Equation 1)}$$

The updated $w_i$ 58 is the output of the STDP circuit 22, and the updated $w_i$ 58 is also written back into the STDP memory 80.

Figure 7B:
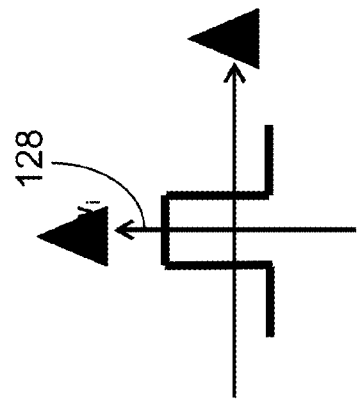
FIG. 7B shows an transfer characteristic of the internal comparator.
Figure 7C:
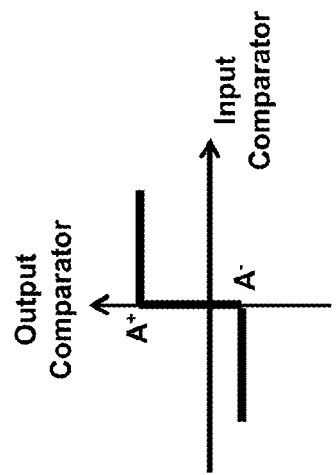
FIG. 7C shows an overall STDP transfer characteristic in accordance with the present disclosure.
Figure 7A:
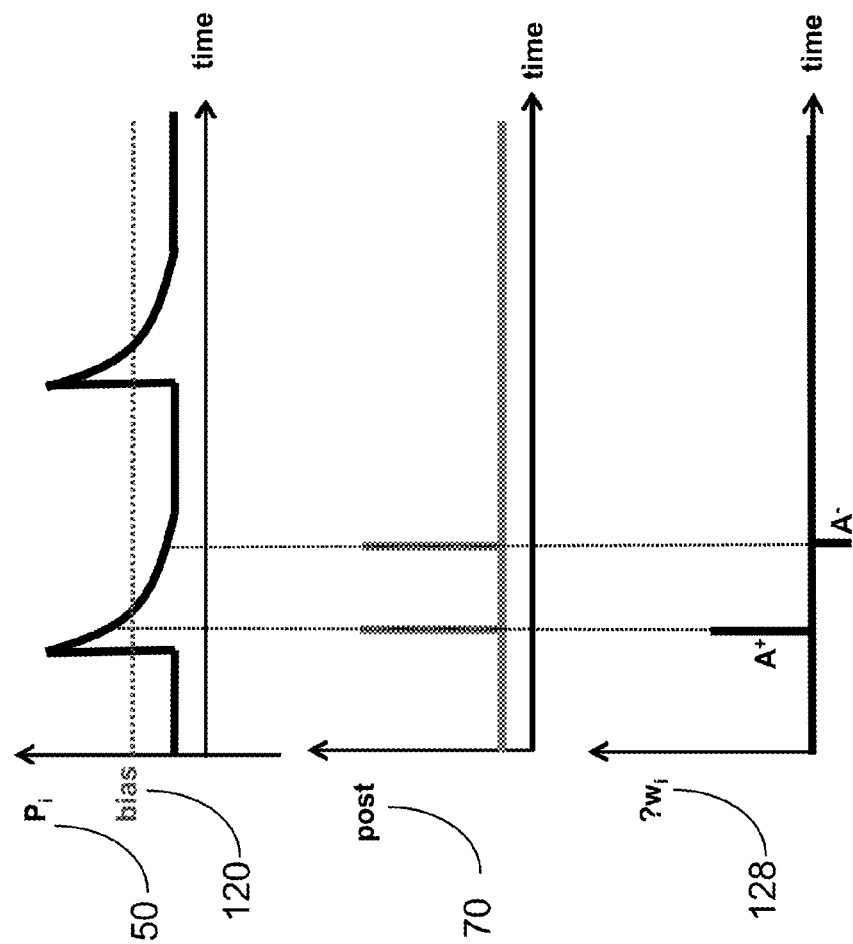
FIG. 7A shows typical waveforms of input signals and of an $\Delta w_i$ signal generated by the STDP circuit.

FIG. 7A shows an example of waveforms of signals $P_i$ 50, post 70, and $\Delta w_i$ 128 in one example node. The index i is used for the $P_i$ 50 and $\Delta w_i$ 128 signals to indicate that the signal is time multiplexed and that is only valid during each time slot i. Note that in the plot the Pi signal 50 appears continuous. However, the signal is produced only once each cycle, that is, once per each 1.024 milliseconds for the embodiment shown in FIGS. 3, 4 and 6, which each have 128 time slots.

The signal Pi 50 consists of positive edges followed by decaying or falling exponentials. The timing of the positive steps corresponds to the times at which one pre-synaptic neuron circuit 18, which is a neuron circuit 18 located in a different node 14 and connected to the example node 14 by the interconnect fabric 44, is spiking.

The signal post 70 consists of spikes produced by a post-synaptic neuron circuit 18, which is the neuron circuit 18 located in the example node 14.

The signal $\Delta wi$ 128 is calculated by the circuitry shown in FIG. 6. The signal $\Delta wi$ 128 is only updated when there is a spike in either the pre-synaptic neuron circuit 18 (enabled by $pre_i$ 54) or the post-synaptic neuron circuit 18 (enabled by post 70). The value of $\Delta w_i$ 128 depends on the relative timing of spikes at the pre-synaptic neuron circuit 18 and the post-synaptic neuron circuit 18.

In FIG. 7A is shown an example of the values of $\Delta w_i$ 128 for cases in which two spikes happen at different times at the post signal 70. The first spike that happens at post (post-synaptic spike) 70 in the example occurs shortly after the first positive step of signal Pi 50, which corresponds to a presynaptic spike from a pre-synaptic neuron circuit 18. At the time of the first spike of post 70 the value of Pi 50 is higher than bias 120. The resulting $\Delta w_i$ is positive. The second spike that happens at post 70 in the example occurs further after the first positive step of signal Pi 50. At the time of the second spike of post the value of Pi 50 is lower than bias 120. The resulting $\Delta w_i$ is negative.

FIG. 7B shows the output-input transfer characteristic of the comparators 112 and 114 of the STDP circuit 22 shown in FIG. 6.

FIG. 7C shows the transfer function of the STP circuit 22 of FIG. 6. The horizontal axis is the timing difference between a presynaptic and a postsynaptic spike. The vertical axis is the weight change $\Delta w_i$ 128 produced by the STDP circuit 22 of FIG. 6. In this embodiment of a STDP circuit 22 the weight change $\Delta w_i$ 128 increases when the time difference is small, and the weight change $\Delta w_i$ 128 decreases when the time difference is large.

In another embodiment of the STDP circuit 22 of FIG. 6 the polarity of either one or both of the comparators 112 and 114 may be changed. This may change the STDP transfer characteristic from symmetrical to anti-symmetrical. For example the Pi 50 input can be connected to the negative input of the comparator 112, rather than the positive input, and the bias 120 may be connected to the positive input of the comparator 112, rather than the negative input.

The STDP circuit 22 may also have exponential characteristics, as described in Reference [3].

FIG. 8A shows a detail of S-to-E circuits 72 and 74 shown in FIG. 2. The "S-to-E" (Spike-to-Exponential) circuits 72 and 74 convert spikes into positive steps followed by falling exponentials. The "S-to-E" (Spike-to-Exponential) circuit of FIG. 8A has an adder 140, a multiplier 142, a parameter k 144, which is used to set the time constant, and a memory 146, which may be a register. The parameter k 144 may be stored in memory 3 and typically k has a value slightly smaller than 1. The adder 140 is connected to the input 138 and to a value read from memory 146, which may begin at zero. Then the adder output is multiplied by parameter k 144, and the result is written back into memory 146 and output.

FIG. 8B shows a detail of "E-to-S" (Exponential-to-Spike) circuit 52 shown in FIG. 2. The "E-to-S" circuit converts positive steps with falling exponentials into spikes. Typically the bias 148 has a value slightly smaller than a maximum amplitude of the input signal 147.

FIG. 8C shows a detail of the synapse circuit 16. The amplifier 61 has a variable gain, which is set by the output of multiplier 57, which multiplies $x_i$ 56 times $w_i$ 58 The signals $x_i$ 56 and $w_i$ 58 are produced by the STP 20 and STDP 22 circuits, respectively, as described above. The output signal 60 of the synapse circuit 16 is time multiplexed and updated in every time slot 110$i$, which as described above may be for I=1 to 128 for one embodiment. This time multiplexing allows a single synapse circuit 16 in a node 14 to emulate the behavior of multiple virtual synapses each driven by the output P 73 of neurons 18 in other nodes 14, which in one embodiment may number 128.

FIG. 8D shows a detail of the KD (kinetic dynamics) circuit 24. It is composed of a 1:N multiplexer 150, an array of N "S-to-E" circuits 152, and a summer 154. The number N may be typically 4. Each one of the S-to-E circuits 152 may be implemented as shown in FIG. 8A; however each S-to-E circuit 152 may have a different internal parameter k 144. The kinetic dynamics circuit 24 is used convert spike signals 60 produced by the synapse circuit 16 of FIG. 8C into positive steps with falling exponentials with a set of N possible time decay constants. The kinetic dynamics circuit 24 is used to mimic the output behavior of multiple types of biological synapses.

FIG. 9A shows an embodiment of a neuron circuit 18, which as shown has an accumulator 160, which may have 9 bits, whose output is compared by a comparator 162 to a threshold Vth 164. As shown, if the sum of the accumulator 160 exceeds the threshold Vth 164, the neuron output 70 is a spike and the accumulator is reset. The neuron input 68 is from all the time multiplexed inputs 68. A spike at the neuron output 70 may occur at any time, or there may be no spike at all. The rate of spikes at the output 70 may range from 0 Hz to less than 1 kHz; however, depending on the implementation of the neural circuit, the rate may be much higher. An embodiment of a neuron circuit 18 is further described in Reference [3].

FIG. 9B shows a detail of the HP (Homeostatic Plasticity) circuit 26, which is connected between the output 70 of the neuron circuit 18 and the multiplier 64, as shown in FIG. 2. The HP circuit 26 has a digital or an analog low pass (LP) filter 170, a comparator 172, a summer 174, and a bias term 176, which may have a value 1 in one embodiment. Parameters for the low pass filter may be stored in memory 3. The output 70 is filtered by the low pass filter 170. The result is input to comparator 172 and compared to the $f_{target}$ 173. The output of the comparator 172 is negative when the output of the LP filter 170 exceeds the $f_{target}$ 173. This allows the HP circuit 26 to regulate the spiking rate of the neuron circuit 18 to a rate defined by $f_{target}$ 173, which may be stored in memory 3. Some parts of this circuit are similar to a circuit described in Reference [4]; however, the circuit of FIG. 9B is intended to drive a digital multiplier instead than an amplifier as described in Reference [4].

FIG. 9C shows an AD (Axonal Delay) circuit 28. The AD circuit 28 is connected to the output 70 of the neuron circuit 18, as shown in FIG. 2. The AD circuit 28 has a set of digital delay stages 180 and a multiplexer (MUX) 182. The AD circuit 28 of FIG. 9C produces delays that are aligned to a clock 184. An AD circuit is also described in Reference [4]; however, the AD circuit described in Reference [4] produces asynchronous delays. The AD circuit 28 delays the spikes produced by the neuron circuit 18, so that the neuron circuit 18 output is aligned to the cycle times indicated in FIG. 3, which makes the spike timing compatible with the time multiplexed circuitry in the E-to-S 52, the STP 20, the STDP 22, the synapse 16 circuitry.

The circuit of the invention may be implemented with many integrated circuit technologies, including CMOS. A reduction to practice design has been made using 90 nm CMOS. This design has over 1000 nodes, over 1000 neurons and over 100,000 synapses with STP, STDP, KD, HP and AD. The neural circuit 10 of this 90 nm design has an area of less than 2 cm$^2$ and a power of less than 1 Watt.

FIG. 10A shows an end-to-end simulation a network consisting of a 16 neurons receiving 16 external inputs. These 16 neurons are connected via 16 synapses with STDP and STP to an output neuron. The neural circuit can determine which inputs are correlated to each other. The top graph of FIG. 10A shows the 16 inputs to the chip, which are labeled as Pre 1 to Pre 16, and the spiking output post of the output neuron. The bottom graph of FIG. 10A shows the weights wi*xi of the 16 synapses of the output neuron. All the weights of synapses receiving correlated inputs evolve to a high state, as desired. All the weights of synapses receiving uncorrelated inputs evolve to a low state, as desired. This simulation shows proper operation of the core neuron and synapse circuits as well as other circuitry.

FIG. 10B shows a simulation of the STP (Short Term Plasticity) circuit 20, which is used to calculate a signal x that is used to further adjust the gain of a synapse according to the recent spikes received at the input of the synapse. This STP circuit 20 is used in addition to the STDP (Spike Timing Dependent Plasticity) circuit 22. The top graph of FIG. 10B shows the spike signal at the input of synapse. The bottom graph of FIG. 10B shows the output signal produced by the STP circuit 22. This output signal consists of a step happening at the time of the input spike, followed by an exponential. The transistor-level simulation matched the expected behaviors.

FIG. 10C shows a simulation of a HP (Homeostatic Plasticity) circuit 26. The HP circuit 26 is used to adjust the spiking rate of a neuron circuit 18 to a given target rate. In the example the target rate is 50 Hz. The top graph of FIG. 10C shows the spiking output of the neuron circuit. The bottom graph of FIG. 10C shows actual measured spiking rate, and is close to the target rate as desired.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . ."

What is claimed is:

1. A circuit for emulating the behavior of biological neural circuits, the circuit comprising:
   a plurality of nodes wherein each node comprises:
      a neuron circuit;
      a time multiplexed synapse circuit coupled to an input of the neuron circuit;
      a time multiplexed short term plasticity (STP) circuit coupled to an input of the node and to the synapse circuit;
      a time multiplexed Spike Timing Dependent Plasticity (STDP) circuit coupled to the input of the node and to the synapse circuit; and
      an output of the node coupled to the neuron circuit; and
   an interconnect fabric coupled between the plurality of nodes for providing coupling from the output of any node of the plurality of nodes to any input of any other node of the plurality of nodes.

2. The circuit of claim 1:
   wherein the input of a respective node is time multiplexed between the outputs of N nodes of the plurality of nodes, wherein an output of node i of the N nodes is coupled to the input of the respective node for a time slot i, wherein N time slots is a cycle, and wherein an output of each of the N nodes is coupled to the input of the respective node for a same time slot in each cycle;
   wherein the time multiplexed STP circuit calculates a weight $x_i$ for the synapse circuit on each time slot i; and
   wherein the time multiplexed STDP circuit calculates a weight $w_i$ for the synapse circuit on each time slot i.

3. The circuit of claim 1 further comprising:
   an exponential to spike (E-to-S) conversion circuit coupled between the input of the node and the synapse circuit, the STP circuit, and the STDP circuit.

4. The circuit of claim 2 wherein the STP circuit comprises:
   an STP computation circuit; and
   an STP memory;
   wherein the STP memory has N addresses; and
   wherein the STP computation circuit comprises:
      an input coupled to the (E-to-S) conversion circuit;
      a first adder coupled to the input and to the STP memory;
      a stored parameter b coupled to the adder;
      wherein the first adder adds the input, subtracts the parameter b, and adds a value $x_i$ read from address i of the STP memory for time slot i;
      a multiplier for multiplying the output of the first adder by a stored parameter k; and
      a second adder for adding a product of the multiplier and the parameter b to produce a result $x_i$ for time slot i;
   wherein the result $x_i$ for time slot i is written into address i of the STP memory.

5. The circuit of claim 2 wherein the STDP circuit comprises:
   an STDP computation circuit; and
   an STDP memory;
   wherein the STDP memory has N addresses; and
   wherein the STDP computation circuit comprises:
      a first input coupled to the input of the node;
      a second input coupled to an output of the neuron circuit;
      a first spike to exponential (S-to-E) conversion circuit coupled to the output of the neuron circuit;
      a first comparator having a first input coupled to the input of the node, a second input coupled to a stored bias parameter, and an enable input coupled to the output of the neuron circuit, wherein the enable input enables a first comparator output;
      a second comparator having a first input coupled to an output of the first S-to-E conversion circuit, a second input coupled to the stored bias parameter, and an enable input coupled to an output of the E-to-S conversion circuit, wherein the enable input enables a second comparator output;
      a first adder for adding the outputs of the first and second comparator; and
      a second adder for adding an output of the first adder and a value $w_i$ read from address i of the STDP memory for time slot i to produce a result $w_i$ for time slot i;
   wherein the result $w_i$ for time slot i is written into address i of the STDP memory.

6. The circuit of claim 5 wherein:
   the first input of the first comparator is coupled to a positive input of the first comparator;
   the second input of the first comparator is coupled to a negative input of the first comparator;
   the first input of the second comparator is coupled to a positive input of the second comparator; and
   the second input of the second comparator is coupled to a negative input of the second comparator.

7. The circuit of claim 5 wherein:
   the first input of the first comparator is coupled to a negative input of the first comparator;
   the second input of the first comparator is coupled to a positive input of the first comparator;
   the first input of the second comparator is coupled to a positive input of the second comparator; and
   the second input of the second comparator is coupled to a negative input of the second comparator.

8. The circuit of claim 5 wherein:
   the first input of the first comparator is coupled to a negative input of the first comparator;

the second input of the first comparator is coupled to a positive input of the first comparator;
the first input of the second comparator is coupled to a negative input of the second comparator; and
the second input of the second comparator is coupled to a positive input of the second comparator.

9. The circuit of claim 2 wherein the synapse circuit comprises:
a multiplier for multiplying $x_i$ from the STP circuit times the $w_i$ from the STDP circuit to calculate a product $x_i w_i$; and
a variable gain amplifier that has a gain that depends on the product $x_i w_i$.

10. The circuit of claim 1 wherein the neuron circuit comprises:
an accumulator for summing an input to the neuron circuit; and
a comparator for comparing an output of the accumulator to a stored threshold parameter;
wherein if the output of the accumulator is greater than the threshold parameter, the output of the neuron circuit is a spike and the accumulator is reset to zero.

11. The circuit of claim 3 wherein the E-to-S conversion circuit comprises:
a memory;
an adder coupled to the input of the node and to the memory for adding the input on time slot i to a value read from the memory; and
a multiplier for multiplying an output of the adder and a stored parameter k for calculating a product;
wherein at each time slot I the product is written into the memory.

12. The circuit of claim 1 further comprising:
a kinetic dynamics (KD) circuit coupled to the output of the synapse circuit;
a homeostatic plasticity (HP) circuit coupled to the output of the neuron circuit; and
a multiplier coupled to an output of the KD circuit an output of the HP circuit for multiplying the output of the KD circuit times the output of the HP circuit;
wherein an output of the multiplier is an input to the neuron circuit.

13. The circuit of claim 12 wherein:
the homeostatic plasticity (HP) circuit comprises:
a low pass filter coupled to the output of the neuron circuit;
a comparator coupled to an output of the low pass filter and to a stored parameter $f_{target}$; and
an adder coupled the an output of the comparator for adding the output of the comparator and a second stored parameter;
wherein an output of the adder is coupled to the multiplier.

14. The circuit of claim 12 wherein:
the KD circuit comprises:
a 1 to J multiplexer coupled to the output of the synapse circuit;
J spike to exponential (S-to-E) conversion circuits coupled to an output of 1 to J multiplexer, wherein each of the J spike to exponential (S-to-E) conversion circuits may have a different time decay constant; and
an adder coupled to outputs of the J S-to-E conversion circuits;
wherein an an output of the adder is coupled to the multiplier.

15. The circuit of claim 1 further comprising:
an axonal delay (AD) circuit coupled to the output of the neuron circuit; and
a second spike to exponential (S-to-E) conversion circuit coupled to the output of the AD circuit;
wherein the output of the node is the output of the second S-to-E conversion circuit.

16. The circuit of claim 15 wherein the axonal delay (AD) circuit comprises:
an input coupled to the output of the neuron circuit;
a plurality of delay elements connected in series, wherein each delay element has an output and wherein each delay element is coupled to a clock that is aligned to the time slots; and
a multiplexer coupled to the output of each delay element;
wherein an output of the multiplexer to the second spike to exponential (S-to-E) conversion circuit.

17. A method for emulating the behavior of biological neural circuits, the method comprising:
providing a plurality of nodes;
providing a neuron circuit in each node;
providing a synapse circuit in each node coupled to an input of the neuron circuit;
providing a short term plasticity (STP) circuit in each node coupled to an input of the node and to the synapse circuit;
providing a Spike Timing Dependent Plasticity (STDP) circuit in each node coupled to the input of the node and to the synapse circuit;
providing an output of the node coupled to the neuron circuit;
time multiplexing the synapse, the STP, and the STDP circuits; and
providing an interconnect fabric coupled between the plurality of nodes for providing coupling from the output of any node of the plurality of nodes to any input of any other node of the plurality of nodes.

18. The method of claim 17:
wherein the input of a respective node is time multiplexed between the outputs of N nodes of the plurality of nodes, wherein an output of node i of the N nodes is coupled to the input of the respective node for a time slot i, wherein N time slots is a cycle, and wherein an output of each of the N nodes is coupled to the input of the respective node for a same time slot in each cycle;
wherein the time multiplexed STP circuit calculates a weight $x_i$ for the synapse circuit on each time slot i; and
wherein the time multiplexed STDP circuit calculates a weight $w_i$ for the synapse circuit on each time slot i.

19. The method of claim 17 further comprising:
converting the input of the node from an exponential to a spike using an exponential to spike (E-to-S) conversion circuit coupled between the input of the node and the synapse circuit, the STP circuit, and the STDP circuit.

20. The method of claim 18 wherein providing the STP circuit comprises:
providing an STP computation circuit; and
providing an STP memory;
wherein the STP memory has N addresses; and
wherein the STP computation circuit:
adds an input coupled to the (E-to-S) conversion circuit to the negative of stored parameter b and adds a value $x_i$ read from address i of the STP memory for time slot i;
multiplies a sum of the adding by a stored parameter k; and
adds a product of the multiplier and the parameter b to produce a result $x_i$ for time slot i;

wherein the result $x_i$ for time slot i is written into address i of the STP memory.

21. The method of claim 18 wherein providing the STDP circuit comprises:
  providing an STDP computation circuit; and
  providing an STDP memory;
  wherein the STDP memory has N addresses; and
  wherein the STDP computation circuit:
    compares a first input coupled to the input of the node to a second input coupled to a stored bias parameter, wherein a first enable input coupled to the output of the neuron circuit enables a first comparison output;
    compares a third input coupled to an output of a S-to-E conversion circuit coupled to the output of the neuron circuit to a fourth input coupled to the stored bias parameter, wherein a second enable input coupled to an output of the E-to-S conversion circuit enables a second comparator output;
    adding the outputs of the first and second comparator to produce a sum; and
    adding the sum and a value $w_i$ read from address i of the STDP memory for time slot i to produce a result $w_i$ for time slot i;
  wherein the result $w_i$ for time slot i is written into address i of the STDP memory.

22. The method of claim 18 wherein providing the synapse circuit comprises:
  multiplying $x_i$ from the STP circuit times the $w_i$ from the STDP circuit to calculate a product $x_i w_i$; and
  amplifying the input to the synapse by an amount that depends on the product $x_i w_i$.

23. The method of claim 17 wherein providing the neuron circuit comprises:
  accumulating inputs to the neuron circuit; and
  comparing a value of the accumulating to a stored threshold parameter;
  wherein if the value is greater than the threshold parameter, the output of the neuron circuit is a spike and the accumulator is reset to zero.

24. The method of claim 17 further comprising:
  providing a kinetic dynamics (KD) circuit coupled to the output of the synapse circuit;
  providing a homeostatic plasticity (HP) circuit coupled to the output of the neuron circuit; and
  multiplying an output of the KD circuit times an output of the HP circuit; and
  providing the product of the multiplying to the neuron circuit.

25. The method of claim 24 wherein:
Providing the homeostatic plasticity (HP) circuit comprises:
  low pass filtering outputs of the neuron circuit;
  comparing an output of the low pass filter to a stored parameter $f_{target}$; and
  adding an output of the comparator and a second stored parameter to form a sum that is provided for the step of multiplying.

26. The method of claim 24 wherein providing the KD circuit comprises:
  providing J spike to exponential (S-to-E) conversion circuits coupled to an output of a 1 to J multiplexer, wherein each of the J spike to exponential (S-to-E) conversion circuits may have a different time decay constant; and
  adding outputs of the J S-to-E conversion circuits to form a sum that is provided for the step of multiplying.

27. The method of claim 17 further comprising:
  providing an axonal delay (AD) coupled to the output of the neuron circuit; and
  converting a spike output of the AD circuit to an exponential.

* * * * *